United States Patent Office 3,449,325
Patented June 10, 1969

3,449,325
PENICILLINS AND PROCESS FOR
PREPARING THEM
Helmut Nahm, Kelkheim, Taunus, Walter Siedel, Bad
Soden, Taunus, and Edgar Luding, Frankfurt am Main,
Germany, assignors to Farbwerke Hoechst Aktiengesellschaft vormals Meister Lucius & Bruning, Frankfurt
am Main, Germany
No Drawing. Filed Oct. 13, 1964, Ser. No. 403,646
Claims priority, application Germany, Oct. 18, 1963,
F 41,025
Int. Cl. C07d 99/16; A61k 21/00
U.S. Cl. 260—239.1                                12 Claims

ABSTRACT OF THE DISCLOSURE

The claimed invention resides in synthetic-α-phenoxyalkyl pencillins which have biological activity.

---

Synthetic α-phenoxyalkyl-pencillins in which the phenyl nucleus carries various substituents have already been described.

It has been found that penicillins with outstanding biological activity and excellent stability to acids can be obtained by reacting 6-amino-penicillamic acid in the presence of a proton acceptor with a derivative of an α-phenoxy fatty acid of the general formula

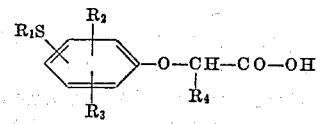

in which $R_1$ represents a straight-chain or branched alkyl, aralkyl, hydroxyalkyl, epoxyalkyl, alkylaminoalkyl, dialkylaminoalkyl, phenyl, nitrophenyl, dinitrophenyl, halogenonitrophenyl, alkenylalkyl, arakenylalkyl, alkylnitrophenyl, or halogenoalkyl-nitrophenyl radical; $R_2$ stands for hydrogen, lower alkyl or halogen; $R_3$ represents hydrogen, low alkyl, halogen, hydroxyl or alkoxy; $R_4$ represents hydrogen or lower, straight-chain or branched alkyl, alkoxyalkyl, phenyl, halogenophenyl.

The radicals $R_1$ to $R_4$ may include the following:

$R_1$=straight-chain or branched alkyl radicals with 1 to 12 carbon atoms, preferably 1 to 4 carbon atoms, for example methyl, ethyl, propyl, isopropyl, butyl, sec-butyl, isobutyl, tert.butyl, amyl, isoamyl, neopentyl, hexyl, isohexyl, neohexyl heptyl, isoheptyl, octyl, isooctyl, 3-ethylhexyl, nonyl, decyl, undecyl, dodecyl; cycloalkyl radicals with 3 to 8 carbon atoms in the nucleus, for example cyclopropyl, cyclobutyl, cyclopentyl, cyclohexyl, cycloheptyl, cyclooctyl, dimethylcyclopropyl, methylcyclohexyl, dimethylcyclohexyl; hydroxyalkyl radicals, for example β-hydroxyethyl, γ-hydroxypropyl, 2,3-dihydroxypropyl, ω-hydroxybutyl; aralkyl radicals, for example benzyl, β-phenylethyl, γ-phenylpropyl, α-phenylethyl, α-phenylpropyl; alkylaminoalkyl radicals, for example β-methylaminoethyl, β-ethylaminoethyl, β-propylaminoethyl; dialkylaminoalkyl radicals, for example β-dimethylaminoethyl, β-diethylaminoethyl, β-dipropylaminoethyl, β-dibutylaminoethyl, β-piperidinoethyl, β-pyrrolidinoethyl, β-morpholinoethyl; nitrophenyl radicals, such as o-nitrophenyl, m-nitrophenyl and p-nitrophenyl; dinitrophenyl radicals, for example 2,4-dinitrophenyl, 2,6-dinitrophenyl; halogenonitrophenyl radicals such as 2-chloro-6-nitrophenyl, 2-chloro-4-nitrophenyl, 2-bromo-6-nitrophenyl, 2-bromo-4-nitrophenyl, 4-chloro-2-nitrophenyl, 4-bromo-2-nitrophenyl; alkenylalkyl radicals, for example allyl, γ,γ-dimethylallyl, γ-methylallyl, γ-ethylallyl; aralkenylalkyl radicals, for example cinnamyl, γ,γ-diphenylallyl; alkylnitrophenyl radicals, for example 2-methyl-6-nitrophenyl, 4-methyl-2-nitrophenyl, 2-methyl-4-nitrophenyl, 2,6-dimethyl-4-nitrophenyl, 3,5-dimethyl-4-nitrophenyl, 2-ethyl-6-nitrophenyl, 4-ethyl-2-nitrophenyl, 2-ethyl-4-nitrophenyl, 2,6-diethyl-4-nitrophenyl, 3,5 - diethyl - 4-nitrophenyl; halogenoalkyl-nitrophenyl radicals, for example 2-chloro-4-methyl-6 - nitrophenyl, 2-bromo-4-methyl-6-nitrophenyl, 2-methyl-4-chloro-6-nitrophenyl, 2-methyl-4-bromo-6-nitrophenyl, 2-chloro-4-nitro-6-methylphenyl, 2-bromo-4-nitro-6-methylphenyl;

$R_2$=hydrogens, alkyl radicals with 1 to 4 carbon atoms and halogens, preferably chlorine or bromine;

$R_3$=hydrogen, alkyl radicals with 1 to 4 carbon atoms halogens, preferably chlorine or bromine, hydroxyl, or alkoxy radicals with 1 to 4 carbon atoms;

$R_4$=hydrogen, alkyl radicals with 1 to 4 carbon atoms, alkoxyalkyl radicals in which the alkyl group as well as the alkoxy group may contain 1 to 4 carbon atoms; phenyl radicals and halogenophenyl radicals, for example 2-chlorophenyl, 4-chlorophenyl, 2-bromophenyl, 4-bromophenyl.

Instead of α-phenoxy fatty acid halides, especially chlorides and bromides, other reactive α-phenoxy fatty acid derivatives can be reacted with 6-amino-pencillamic acid, for example symmetric or mixed anhydrides, activated esters or azides of the corresponding acids.

By mixed anhydrides there are to be understood in the present specification compounds of the following formula

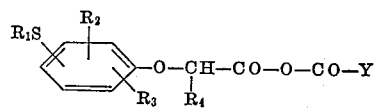

in which $R_1$, $R_2$, $R_3$, and $R_4$ have the meanings defined above and Y stands for an alkyl radical with 1 to 11 carbon atoms, an alkoxy radical preferably having 1 to 4 carbon atoms, phenyl aralkyl, advantageously benzyl. The inner anhydrides which can also be used as acylating agents in the process of the invention have the formula

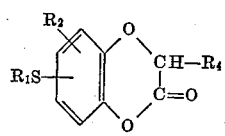

in which $R_1$, $R_2$ and $R_4$ have the meaning given above. As activated esters there can be used, for example, thiophenyl esters, nitrothiophenyl esters, nitrophenyl esters and cyanomethyl esters.

Suitable proton acceptors are, for example the alkali metal and alkaline earth metal salts of weak acids, such as carbonic acid, boric acid, acetic acid, phosphoric acid, citric acid, or tertiary organic bases such as triethylamine, tripropylamine, tributylamine, N-methylpiperidine, N-ethylpyrrolidine, N - methylmorpholine, endo - ethylenepiperazine, pyridine, collidine or picoline.

The α-phenoxy fatty acids used as starting material are prepared from phenols of the general formula

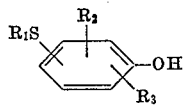

in which $R_1$, $R_2$ and $R_3$ have the meaning given above and a free α-halogenofatty acid of the general formula

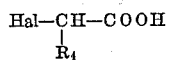

in which $R_4$ has the meaning given above, or an α-halogenofatty acid ester in the presence of alkali. In the latter case the esters, which have been purified if necessary by distillation are transformed into the free α-phenoxy fatty acid by a treatment with alkalies and then with dilute mineral acids. From the α-phenoxy fatty acids obtained the acid halides, symmetric anhydrides or mixed anhydrides and activated esters are prepared in known manner. The azides are obtained from the esters of acid chlorides.

In the reaction of the α-phenoxy fatty acid derivatives with 6-aminopenicillamic acid the reaction conditions applied depend on the reactivity of the components. The reaction with an α-phenoxy fatty acid halide is preferably carried out at a temperature of about 0° C. to 5° C.; the temperature shall not exceed 30° C. The pH value is maintained in the range between 6 and 9 with the use of buffer solutions, preferably sodium bicarbonate solution or di-sodium phosphate solution. The reaction can be carried out not only in aqueous buffer solutions but also in the presence of organic solvents miscible with water, for example acetone, dimethyl formamide, dimethyl acetamide, dioxane, tetrahydrofurane. The reaction of the α-phenoxy fatty acid halides with 6-aminopenicillamic acid can likewise be brought about, for example, in an aqueous acetonic solution in the presence of sodium bicarbonate. When the reaction is terminated the solution is diluted with water, adjusted to pH 2 with phosphoric acid of 20% strength and extracted with ethyl acetate. After drying with anhydrous magnesium sulfate the calculated amount of a methanolic solution of anhydrous potassium acetate is added to the extract. The potassium salts of the novel penicillins separate in the form of crystals in a short period of time. All yields obtained are very good.

The 6-aminopenicillamic acid can likewise be reacted with a symmetric or mixed anhydride of an α-phenoxy fatty acid or an anhydride of the type of 1,4-benzodioxane-3-one. This reaction is suitably carried out in aqueous acetonic solution in the presence of a tertiary amine, preferably triethylamine.

Still further, the reaction of 6-aminopenicillamic acid with an activated ester, preferably a p-nitrophenyl ester, p-nitrophenyl-thioester and cyanomethyl ester of a substituted α-phenoxy fatty acid can be carried out in acetone or dioxane solution in the presence of a proton acceptor.

The reaction of 6-aminopenicillamic acid with the azides of an appropriate α-phenoxy fatty acid is carried out in the same manner as with the anhydrides.

For working up the reaction mixture the unreacted starting substances are extracted with ethyl or butyl acetate or with a ketone immiscible with water, for example sec. butylmethyl ketone. The aqueous phase is cooled, acidified with dilute mineral acid and the reaction product is extracted in the form of the free acid, for example with ether or ethyl acetate. Before they are further worked up the extracts are dried, for example by shaking them with magnesium sulfate.

The products of the invention are generally isolated with alkali metal, alkaline earth metal or ammonium compounds or with organic bases or the salts thereof, which are added in the form of a solution or suspension. By "compounds" there are mainly understood salts, hydroxides or alcoholates. Salts of organic acids have proved to be especially suitable, particularly the salts of aliphatic and cycloaliphatic carboxylic acids such as acetic acid and ethylhexane-carboxylic acids, and in the first place the potassium and sodium salts of the latter. Organic bases or the salts thereof can likewise be used, since the penicillin salts formed have often the advantage of being difficultly soluble. Suitable organic bases are those which contain nitrogen. The salts of the novel penicillins can furthermore be obtained by transforming a salt obtained by precipitation into the desired product by a subsequent second reaction with one of the aforesaid compounds. It is likewise possible, of course, to isolate the salts of the penicillins from their aqueous solutions by lyophilization. The free acids are obtained from the aqueous solutions of the alkali metal salts with dilute mineral acids, often in the form of crystals.

The yields obtained in the process of the invention are excellent.

When one of the α-phenoxy fatty acids has an asymmetric center a mixture of the two stereoisomers is obtained in the preparation of the claimed penicillins. Both isomeric forms are biologically active. According to the process of the invention the stereoisomers as well as the racemic compounds thereof are prepared.

In order to obtain the pure stereoisomers, either the pure (L) forms or the pure (D) forms of the acids are used as starting material. The mixture of the two isomers obtained with the use of the racemic acids can also be separated from one another by physical or chemical methods.

As compared with penicillins known from literature the products obtained by the process of the invention are distinguished by a high stability to acids, an excellent crystallizing property and an outstanding storability. With a high biological titer in the order of magnitude of penicillin G they have practically no action on gram-negative bacteria, so that when administered orally they do not attack the intestinal flora.

The following examples serve to illustrate the invention but they are not intended to limit it thereto.

Example 1.—Potassium salt of 4-methylmercapto-phenoxyacetamidopenicillamic acid 10 grams of 6-aminopenicillamic acid were dissolved, while stirring and cooling, in 20 milliliters of water with the addition of 5 grams of sodium bicarbonate. A solution of 13 grams of 4-methylmercapto-phenoxyacetyl chloride in 40 milliliters of acetone was slowly dropped into the solution obtained. After 2 hours the reaction mixture was covered with a layer of 100 milliliters of ethyl acetate and the pH was adjusted to 2 with 20% phosphoric acid. After having repeatedly extracted, each time with 100 milliliters of ethyl acetate, the combined extracts were filtered and dried with anhydrous magnesium sulfate. An equivalent amount of a solution of anhydrous potassium acetate in methanol was added whereupon the potassium salt of 4-methyl-mercapto-phenoxyacetamidopenicillamic acid separated at once. 20 grams of product were obtained having a melting point of 235° C. (with decomposition, not corrected).

The 4-methylmercapto-phenoxyacetic acid (melting point 117° C., corrected) used for the preparation of the 4-methyl-mercapto-phenoxyacetyl chloride had been prepared by reacting 4-methylmercaptophenol with chloroacetic acid ethyl ester and hydrolyzing the 4-methylmercapto-phenoxyacetic acid ethyl ester obtained. The anilide prepared from the acid chloride melted at 95° C.

Example 2.—Potassium salt of α,4-methylmercaptophenoxypropionyl-amido-penicillamic acid In the manner described in Example 1, 2.0 grams of the above potassium salt were obtained from 1 gram of 6-amino-penicillamic acid and 1.3 grams of α,4-methylmercapto-phenoxy-propionic acid chloride. The salt had a melting point of 220° C. with decomposition. The α,4- methylmercapto-phenoxypropionic acid had a melting point of 95° C.

The anilide obtained from the acid chloride melted at 109° C.

Example 3.—Potassium salt of 4-methylmercapto-3-methylphenoxyacetamido-penicillamic acid In the manner described in Example 1, 2.1 grams of the above penicillin were obtained from 1.0 gram of 6-aminopenicillamic acid and 1.4 grams of 4-methylmercapto-3-methyl-phenoxyacetyl chloride. The product had a melting point of 220° C. with decomposition. The 4-methylmercapto-3-methyl-phenoxyacetic acid had a melting point of 134° C. (corrected).

The corresponding anilide melted at 81° C.

Example 4.—Potassium salt of α-phenyl-4-methylmercapto-phenoxy-acetamido-penicillamic acid In the manner described in Example 1, 2.0 grams of the above penicillin were prepared from 1.1 grams of 6-aminopenicillamic acid and 1.6 grams of α-phenyl-4-methylmercapto-phenoxy-acetyl chloride. The α-phenyl-4-methylmercapto-phenoxy-acetate acid melted at 125° C. (corrected). The corresponding 4-chloroanilide melted at 132° C. (corrected).

Example 5.—Potassium salt of α,4-methylmercapto-phenoxy-β-methoxypropionyl-amido-penicillamic acid In the manner described in Example 1, 2.0 grams of potassium salt were prepared from 1.1 grams of 6-aminopenicillamic acid and 1.4 grams of α,4-methylmercapto-phenoxy-β-methoxy-propionic acid chloride. The salt had a melting point of 110° C. with decomposition.

The α,4-methylmercapto-phenoxy-β-methoxypropionic acid prepared by a conventional method melted at 91°C. The corresponding 4-chloro-anilide had a melting point of 109° C. (corrected).

Example 6.—Potassium salt of α-(4-chlorophenyl)-4-methylmercapto-phenoxy acetamidopenicillamic acid In the manner described in Example 1, 1.1 grams of 6-aminopenicillamic acid were reacted with 1.7 grams of α-(4-chlorophenyl)-4-methylmercapto-phenoxyacetyl chloride. 2.0 grams of a potassium salt were obtained having a melting point of 100° C. with decomposition. The α-(4-chlorophenyl)-4-methylmercapto-phenoxyacetic acid, prepared from α-bromo-4-chlorophenylacetic acid ethyl ester and 4-methylmercaptophenol had a melting point of 132° C. (corrected).

The corresponding 4-chloroanilide melted at 161° C. (corrected).

Example 7.—Potassium salt of α,4-methylmercapto-phenoxy-β-benzyloxypropionylamidopenicillamic acid 1.2 grams of 6-aminopenicillamic acid were reacted as described in Example 1 with 1.8 grams of α,4-methylmercapto-phenoxy-β-benzyl-hydroxypropionic acid chloride. 2.5 grams of potassium salt were obtained having a melting point of 120° C. with decomposition. The α,4-methylmercapto-phenoxy-β-benzyl-hydroxyproionic acid was obtained from α-bromo-β-benzylhydroxypropionic acid methyl ester and 4-methylmercaptophenol. It had a melting point of 103° C. The 4-chloroanilide thereof melted at 116° C.

Example 8.—Potassium salt of α-(4-methylmercapto-phenoxy)-isovaleroyl-amidopenicillamic acid 2.0 grams of 6-aminopenicillamic acid were reacted as described in Example 1 with 2.7 grams of α-(4-methyl-mercapto-phenoxy)-isovaleroyl chloride. 4.0 grams of the above penicillin were obtained having a melting point of 150° C. with decomposition. The α-(4-methylmercapto-phenoxy)-isovaleric acid was prepared from 4-methyl-mercaptophenol and α-bromoisovaleric acid ethyl ester and had a melting point of 85° C. The corresponding anilide melted at 113° C.

Example 9.—Potassium salt of 4-methylmercapto-2-hydroxyphenoxyacetamido-penicillamic acid 2.4 grams of 6-aminopenicillamic acid were dissolved, while cooling and stirring, in 40 milliliters of sodium bcarbonate solution of 4% strength and 40 milliliters of acetone. 5 grams of sodium bicarbonate were added and at 0° C. a solution of 6-methylmercapto-1,4-benzdioxane-3-one was slowly dropped in. The reaction was terminated after 2 hours. The reaction mixture was acidified with 20% phosphoric acid to pH 2 and repeatedly shaken with ethyl acetate. The combined extracts were dried with anhydrous magnesium sulfate. After having added a methanolic solution of anhydrous potassium acetate, the potassium salt of the above acid separate in a yield of 4.3 grams; melting point 245° C. with decomposition. The 6-methylmercapto-phenyl-1.4-dioxane-3-one was prepared from 4-(2-hydroxy - 4 - methylmercapto)-phenoxy-acetic acid and acetic anhydried. It had a boiling point of 163° C. under a pressure of 4 mm. of mercury and a melting point of 68° C.

Example 10.—Potassium salt of 2-methoxy-4-methylmercapto-phenoxyacetamido-penicillamic acid 3.0 grams of 6-aminopenicillamic acid were reacted as described in Example 1 with 4.5 grams of 2-methoxy-4-methylmercapto-phenoxyacetyl chloride. 5.2 grams of the potassium salt of the above penicillin were obtained having a melting point of 165° C. with decomposition.

The 2-methoxy-4-methylmercapto-phenoxyacetic acid was prepared from the ethyl ester of 2-hydroxy-4-methylmercapto-phenoxyacetic acid with dimethylsulfate and alkali. The free acid melted at 99° C.

Example 11.—Potassium salt of 4-methylmercapto-2-butoxy-phenoxyacetamido-penicillamic acid 4.8 grams of the potassium salt melting at 159° C. with decomposition were obtained as described in Example 1 from 3.0 grams of 6-aminopenicillamic acid and 4.5 grams of 4-methylmercapto-2-n-butoxyphenoxyacetyl chloride. The 4-methylmercapto-2-n-butoxyphenoxyacetic acid had been prepared from 2-hydroxy-4-methylmercapto-phenoxyacetic acid and butyl iodide and purified via the ethyl ester (boiling point 156 to 158° C. under a pressure of 0.3 mm. of mercury).

Example 12.—Potassium salt of 2-chloro-4-methylmercapto-phenoxyacetamidopenicillamic acid 1.2 grams of 6-aminopenicillamic acid were reacted as described in Example 1 with 1.2 grams of 2-chloro-4-methylmercapto-phenoxyacetyl chloride. 1.2 grams of potassium salt were obtained having a melting point of 169° C. with decomposition.

The 2-chloro - 4 - methylmercapto-phenoxyacetic acid (melting point 146° C.) had been prepared from the ethyl ester (boiling point 225° C./5 mm.) obtained from 2-chloro-4-methylmercaptophenol and chloroacetic acid ethyl ester.

Example 13.—Potassium salt of α-(4-methylmercapto-2.6-diethylphenoxy)-propionylamidopenicillamic acid 2.4 grams of 6-aminopenicillamic acid were reacted as described in Example 1 with 3.5 grams of α-(4-methylmercapto - 2.6 - diethylphenoxy)-propionic acid chloride (boiling point 160 to 162° C. under 4 mm. of mercury). 4.2 grams of potassium salt were obtained having a melting point of 182° C. with decomposition. The α-4-methylmercapto-2.6-diethyl-phenoxypropionic acid ethyl ester was prepared from 4-methylmercapto-2.6-diethylphenol and α-bromopropionic acid ethyl ester (boiling point 210° C. under 2 mm. of mercury). After hydrolysis the acid was transformed into the acid chloride (boiling point 160 to 162° C. under 3 to 4 mm. of mercury).

Example 14.—Potassium salt of 2-methylmercapto-phenoxyacetamidopenicillamic acid 10 grams of 6-aminopenicillamic acid were reacted as described in Example 1 with 12 grams of 2-methylmercapto-phenoxy-acetylchloride. 18 grams of the above potassium salt were obtained having a melting point of 188° C. with decomposition. The 2-methylmercapto-phenoxyacetic acid ethyl ester (boiling point 163° C./4 to 5 mm. of mercury) was obtained from 2-methylmercapto-phenol and chloroacetic acid ethyl ester. The 2-methyl-mercapto-phenoxyacetic acid (melting point 168° C. (corrected) was obtained by hydrolysis and transformed into the acid chloride.

Example 15.—Potassium salt of 3-methylmercapto-phenoxyacetamido-penicillamic acid 2.4 grams of 6-aminopenicillamic acid were reacted as described in Example 1 with 3 grams of 3-methylmercapto-phenoxyacetyl chloride (boiling point 150° C./4 to 5 mm.). 4.9 grams of the above penicillamic salt were obtained having a melting point of 205° C. with decomposition. The 3-methylmercapto-phenoxyacetic ester (boiling point 152 to 153° C./3 to 4 mm.) was prepared from 3-methylmercapto-phenol and chloroacetic acid ethyl ester. By hydrolysis the 3-methylmercapto-phenoxyacetic acid was obtained having a melting point of 96° C. (corrected).

Example 16.—Potassium salt of 4-cinnamylmercapto-phenoxyacetamidopenicillamic acid 2.4 grams of 6-aminopenicillamic acid were reacted as described in Example 1 with 4 grams of 4-cinnamylmercapto-phenoxyacetyl chloride. 3.9 grams of the above potassium salt were obtained having a melting point of 187° C. with decomposition. The 4-cinnamylmercapto-phenoxyacetic acid was obtained by reacting 4-hydrogen-thiophenoxyacetic acid with cinnamyl chloride, melting point 156° C.

Example 17.—Potassium salt of 4-(n-hexylmercapto)-phenoxyacetamidopenicillamic acid 2.4 grams of 6-aminopenicillamic acid were reacted as described in Example 1 with 5 grams of 4-(n-hexylmercapto-phenoxyacetyl chloride. 3.6 grams of the potassium salt of 4-(n-hexylmercapto)-phenoxy - acetamidopenicillamic acid were obtained having a melting point of 148° C. with decomposition. The 4-(n-hexylmercapto)-phenoxyacetic acid was prepared by reacting 4-mercapto-phenoxyacetic acid with n-hexyl bromide. It had a melting point of 95° C.

Example 18.—Potassium salt of 4-(allylmercapto)-phenoxyacetamidopenicillamic acid 2.4 grams of 6-aminopenicillamic acid were reacted as described in Example 1 with 5 grams of of 4-allymercapto-phenoxyacetyl chloride. 3.4 grams of the above potassium salt were obtained having a melting point of 180° C. with decomposition. The 4-allylmercapto-phenoxyacetic acid was obtained by reacting 4-hydrogen-thiophenoxyacetic acid with allyl chloride. It had a melting point of 85° C.

Example 19.—Potassium salt of 4-(β-phenylethylmercapto)-phenoxyacetamidopenicillamic acid 2.4 grams of 6-aminopenicillamic acid were reacted as described in Example 1 with 3.5 grams of 4-(β-phenylethylmercapto)-phenoxyacetyl chloride. 3.6 grams of the above potassium salt were obtained having a melting point of 180° C. with decomposition. The 4-(β-phenylethylmercapto)-phenoxyacetic acid was prepared by reacting 4-hydrogen-thiophenoxyacetic acid with β-phenylethyl bromide (melting point 109° C.).

Example 20.—Potassium salt of 4-(2.3-epoxypropylmercapto)-phenoxyacetamidopenicillamic acid 2.4 grams of 6-aminopenicillamic acid were reacted as described in Example 1 with 4 grams of 2.3-epoxypropylmercaptophenoxyacetyl chloride. 3.1 grams of the above potassium salt were obtained having a melting point of 238° C. with decomposition. The 2.3-epoxypropylmercapto-phenoxyacetic acid was prepared from epichlorhydrin and 4-hydrogen-thiophenoxyacetic acid.

Example 21.—Potassium salt of 4-benzylmercapto-phenoxyacetamidopenicillamic acid 2.4 grams of 6-aminopenicillamic acid were reacted as described in Example 1 with 5 grams of 4-benzylmercapto-phenoxyacetyl chloride. 3.9 grams of the above potassium salt were obtained having a melting point of 184° C. with decomposition. The 4-benzylmercapto-phenoxyacetic acid was prepared from 4-hydrogen-thiophenoxyacetic acid and benzyl chloride. It had a melting point of 114° C.

Example 22.—Potassium salt of 4-(n-pentylmercapto)-phenoxyacetamidopenicillamic acid 2.4 grams of 6-aminopenicillamic acid were reacted as described in Example 1 with 4 grams of 4-(n-pentylmercapto)-phenoxyacetyl chloride. 3.3 grams of the above potassium salt were obtained having a melting point of 144° C. with decomposition. The 4-(n-pentylmercapto)-phenoxyacetic acid was prepared from 4-hydrogen-thiophenoxyacetic acid and n-amyl bromide.

Example 23.—Potassium salt of 4-(ethylmercapto)-phenoxyacetamidopenicillamic acid 2.4 grams of 6-aminopenicillamic acid were reacted as described in Example 1 with 5 grams of ethylmercapto-phenoxyacetyl chloride. 4 grams of the above potassium salt was obtained having a melting point of 192° C. with decomposition. The ethylmercapto-phenoxyacetic acid melted at 119° C.

Example 24.—Potassium salt of 4-(n-propylmercapto)-phenoxyacetamidopenicillamic acid 2.4 grams of 6-aminopenicillamic acid were reacted as described in Example 1 with 5 grams of n-propylmercapto-phenoxyacetyl chloride. 4.2 grams of potassium salt were obtained having a melting point of 212° C. with decomposition. The n-propylmercapto-phenoxyacetic acid was prepared by reacting 4-hydrogen-thiophenoxyacetic acid with p-propyl chloride. It had a melting point of 114° C.

Example 25.—Potassium salt of 4-(n-butylmercapto)-phenoxyacetamidopenicillamic acid 2.4 grams of 6-aminopenicillamic acid were reacted as described in Example 1 with 4-grams of 4-n-butylmercapto-phenoxyacetyl chloride. 2.9 grams of the above potassium salt were obtained having a melting point of 174° C. with decomposition. The 4-n-butylmercapto-phenoxyacetic acid (melting point 82° C.) was prepared from 4-hydrogen-thiophenoxyacetic acid and n-butyl chloride.

Example 26.—Potassium salt of 4-(γ-phenylpropylmercapto)-phenoxyacetamidopenicillamic acid 2.4 grams of 6-aminopenicillamic acid were prepared as described in Example 1 with 5 grams of γ-phenylpropylmercapto-phenoxyacetyl chloride. 4.1 grams of the above potassium salt were obtained having a melting point of 183° C. with decomposition. The 4-(γ-phenylmercapto)-phenoxyacetic acid (melting point 110° C.) was prepared from 4-hydrogen-thiophenoxyacetic acid and γ-phenylpropyl chloride.

Example 27.—Potassium salt of 4-(2-notrophenylmercapto)-phenoxyacetamidopenicillamic acid 2.0 grams of 6-aminopenicillamic acid were reacted with 3 grams of 4-(2-nitrophenylmercapto)-phenoxyacetyl chloride. 4 grams of potassium salt were obtained having a melting point of 178° C. with decomposition. The 4-(2-nitrophenylmercapto)-phenoxyacetic acid (melting point 130° C.) was prepared from 4-hydrogen-thiophenoxyacetic acid and 2-nitrochlorobenzene.

Example 28

5.0 grams of the potassium salt of 4-methylmercapto-phenoxymethyl penicillin were dissolved in 80 milliliters of water and, while cooling, 2 N hydrochloric acid was dropped in until the pH was 2.5. The free acid of the penicillin separated in the form of fine oil droplets which, after short trituration, form a white crystalline mass. The crystals were filtered off with suction, washed with 200 milliliters of water and dried. 4.3 grams of 4-methylmercapto-phenoxymethyl-penicillin were obtained having a biological activity of 1414 $\mu$/mg. The infrared spectrum showed a slightly shifted $\beta$-lactam band at 1690 K. besides a C=O band of the free carboxyl group at 1640 K.

Example 29.—Potassium salt of 4-cyclopentylmercapto-phenoxyacetamidopenicillamic acid 3.6 grams of 6-aminopenicillamic acid were reacted as described in Example 1 with 7.0 grams of 4-cyclopentyl-mercapto-phenoxyacetyl chloride. 7.3 grams of the above potassium salt were obtained having a melting point of 215° C. with decomposition. The 4-cyclopentylmercapto-phenoxyacetic acid (melting point 109° C.) was prepared from 4-hydrogen-thiophenoxyacetic acid and cyclopentyl bromide.

Example 30.—Potassium salt of 4-cyclohexylmercapto-phenoxyacetamidopenicillamic acid 3.6 grams of 6-aminopenicillamic acid were reacted as described in Example 1 with 7.0 grams of 4-cyclohexyl-mercaptophenoxyacetyl chloride. 8 grams of the above potassium salt were obtained having a melting point of 211° C. with decomposition. The 4-cyclohexymercapto-phenoxyacetic acid having a melting point of 147° C. was obtained from 4-hydrogen-thiophenoxyacetic acid and cyclohexyl bromide.

Example 31.—Potassium salt of 4-(4-nitrophenylmercapto)-phenoxyacetamidopenicillamic acid 2.4 grams of 6-aminopenicillamic acid were reacted as described in Example 1 with 4.0 grams of 4-(4-nitrophenylmercapto)-phenoxyacetyl chloride. 4.8 grams of potassium salt were obtained having a melting point of 205° C. with decomposition. The 4-(4-nitrophenylmercapto)-phenoxyacetic acid (melting point 151° C.) was prepared from 4-hydrogen-thiophenoxyacetic acid and 4-nitro-chlorobenzene.

Example 32.—Potassium salt of 4-(2-nitro-6-methyl-phenylmercapto)-phenoxyacetamidopenicillamic acid 2.4 grams of 6-aminopenicillamic acid were reacted as described in Example 1 with 3.5 grams of 4-(2-nitro-6-methylphenylmercapto) - phenoxyacetyl chloride. 3.0 grams of potassium salt were obtained having a melting point of 190° C. with decomposition. The 4-(2-nitro-6-methylphenylmercapto)-phenoxyacetic acid having a melting point of 192° C. was prepared from 4-hydrogen-thiophenoxyacetic acid and 2-nitro-6-methyl-chlorobenzene.

Example 33.—Potassium salt of 4-dihydroxymethylmercapto-phenoxyacetamidopenicillamic acid 4.8 grams of 6-aminopenicillamic acid were reacted as described in Example 1 with 6.0 grams of dichloromethylmercapto-phenoxyacetyl chloride. 6.1 grams of potassium salt were obtained having a melting point of 196° C. with decomposition. Under the reaction conditions applied both chlorine atoms of the dichloromethylmercapto group were replaced by hydroxyl groups.

Example 34.—Potassium salt of 4-$\beta$-diethylaminoethylmercapto-phenoxyacetamidopenicillamic acid 3.0 grams of 6-aminopenicillamic acid were reacted as described in Example 1 with 4 grams of 4-($\beta$-diethylaminoethylmercapto)-phenoxyacetyl chloride. 6 grams of potassium salt were obtained having a melting point of 176° C. with decomposition. The 4-($\beta$-diethylaminoethylmercapto)-phenoxyacetic acid having a melting point of 124° C. was obtained from 4-hydrogen-thiophenoxyacetic acid and $\beta$-dimethylaminoethyl chloride.

We claim:

1. Compounds of the formula $$R_1S-\underset{R_3}{\underset{|}{\bigcirc}}-\overset{R_2}{\underset{|}{\bigcirc}}-O-CH-CO-NH-CH-\underset{O=C-N-CHCO_2H}{\overset{S}{\underset{|}{CH}}\diagdown}C(CH_3)_2$$

and physiologically tolerable salts thereof wherein:

$R_1$ is a member selected from the group consisting of alkyl having 1 to 6 carbon atoms, allyl, cyclopentyl, cyclohexyl, dihydroxymethyl, epoxypropyl, diethylaminoethyl, phenylalkyl having 1 to 3 carbon atoms in the alkyl group, phenyl allyl, nitromethylphenyl, and nitrophenyl;

$R_2$ is a member selected from the group consisting of hydrogen, methyl, ethyl, phenyl, chlorophenyl, alkoxy having 1 to 4 carbon atoms, hydroxy, and chlorine;

$R_3$ is a member selected from the group consisting of hydrogen and ethyl; and $R_4$ is a member selected from the group consisting of hydrogen, methyl, isopropyl, methoxymethyl, and benzoxymethyl; at least one of $R_2$, $R_3$, and $R_4$ being other than hydrogen.

2. 4 - methylmercapto - phenoxy - acetamido - penicillamic acid and the potassium salt thereof.

3. $\alpha$,4 - methylmercapto - phenoxy - propionylamido-penicillamic acid and the potassium salt thereof.

4. 4 - methylmercapto - 3 - methylphenoxy - acetamidopenicillamic acid and the potassium salt thereof.

5. $\alpha$-phenyl - 4 - methylmercapto - phenoxyacetamido-penicillamic acid and the potassium salt thereof.

6. 4 - ($\beta$ - phenylethylmercapto) - phenoxy - acetamido-penicillamic acid and the potassium salt thereof.

7. $\alpha$-(4 - chlorophenyl) - 4 - methylmercapto-phenoxy-acetamidopenicillamic acid and the potassium salt thereof.

8. $\alpha$ - 4 - methylmercapto - phenoxy - $\beta$ - benzyloxy-propionylamidopenicillamic acid and the potassium salt thereof.

9. $\alpha$ - (4 - methylmercapto - phenoxy) - isovaleroyl-amido-penicillamic acid and the potassium salt thereof.

10. 4 - methylmercapto - 2 - hydrophenoxyacetamido-penicillamic acid and the potassium salt thereof.

11. 2 - methylmercapto - phenoxy - acetamido - penicillamic acid and the potassium salt thereof.

12. 3 - methylmercapto - phenoxy - acetamido - penicillamic acid and the potassium salt thereof.

References Cited

UNITED STATES PATENTS

| | | | |
|---|---|---|---|
| 2,562,408 | 7/1951 | Behrens et al. | 260—239.1 |
| 2,756,226 | 7/1956 | Brandl et al. | 260—239.1 |
| 2,951,839 | 9/1960 | Doyle et al. | 260—239.1 |
| 3,079,306 | 2/1963 | Offe et al. | 260—239.1 |

(Other references on following page)

| | | UNITED STATES PATENTS | |
|---|---|---|---|
| 3,174,964 | 3/1965 | Hobbs et al. | 260—239.1 |
| 3,301,849 | 1/1967 | Gottstein et al. | 260—239.1 |

FOREIGN PATENTS

| | | |
|---|---|---|
| 877,120 | 9/1961 | Great Britain. |
| 878,233 | 9/1961 | Great Britain. |
| 880,400 | 10/1961 | Great Britain. |
| 889,066 | 2/1962 | Great Britain. |
| 908,787 | 10/1962 | Great Britain. |

OTHER REFERENCES

Guorevitch et al., Antibiotics and Chemotherapy, volume 10, pages 121–128, 1960.

NICHOLAS S. RIZZO, *Primary Examiner*.

U.S. Cl. X.R.

424—271